INVENTOR
PIETRO MOLLA
BY Robert H Jacot.
AGENT

INVENTOR
PIETRO MOLLA

BY Robert H. Jacob
AGENT

INVENTOR
PIETRO MOLLA
BY Robert H. Jacob
AGENT

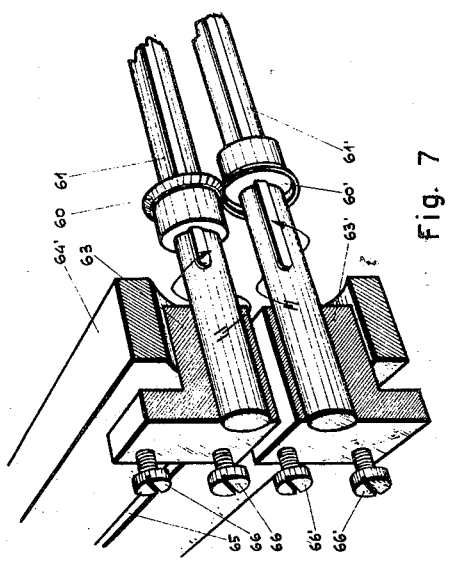

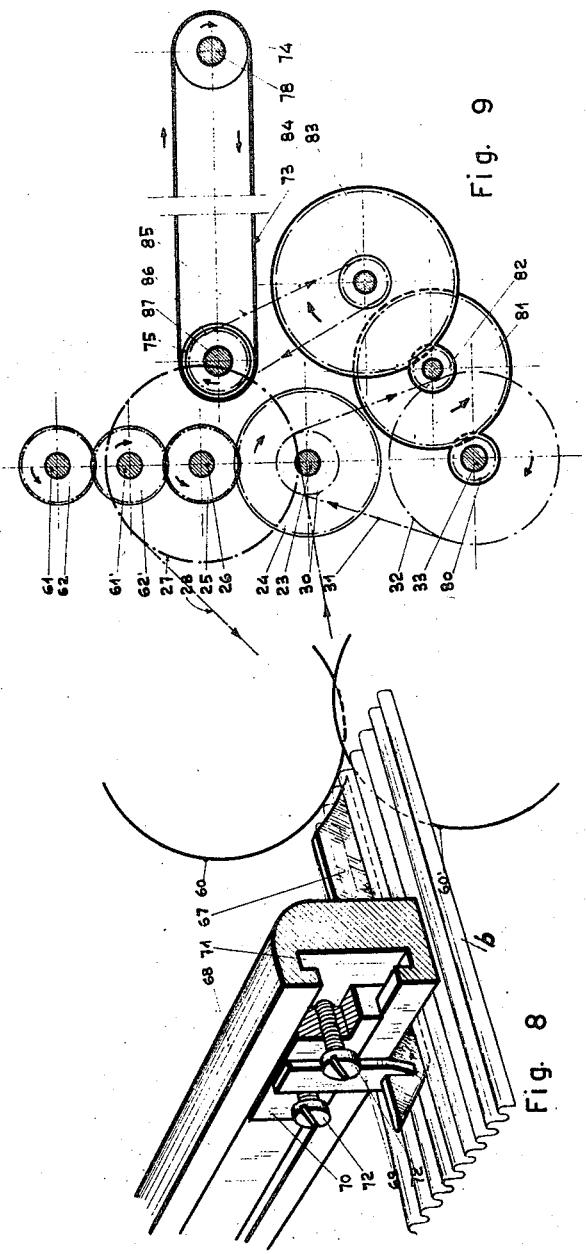

United States Patent Office 2,782,852
Patented Feb. 26, 1957

2,782,852

AUTOMATIC MACHINE FOR CUTTING TO SIZE FROM A ROLL OF CORRUGATED AND DOUBLE CORRUGATED PAPER, SMOOTH CARDBOARD OR OTHER SIMILAR MATERIAL

Pietro Molla, Pontenuovo di Magenta, Italy, assignor to S. A. F. F. A.-S. p. A. Fabbriche Fiammiferi ed Affini, Milan, Italy, an Italian company Application December 28, 1953, Serial No. 400,517

12 Claims. (Cl. 164—62)

This invention relates to automatic machines for cutting to size directly from a roll of double corrugated, single corrugated or smooth paper, thin sheets of wood or other cellulose base fibre material and more particularly to the preparation of rectangles of double corrugated paper suitable for forming tubes by joining the edges of each rectangle in a predetermined manner on a special tube making machine which forms the subject-matter of patent application Serial No. 348,484, now Patent No. 2,764,919, filed on April 13, 1953, by the same applicant.

The conventional machines fitted with circular cutters for cutting to size cellulose base fibre material generally have to be fed with sheets which have been previously trimmed, after the lengthways cut on the roll, to the width desired according to the throat of the machine. The cutting machine covered by this invention, however, allows direct feeding of the paper from a roll onto the machine, the roll having been previously cut lengthways, eliminating the need for an intermediate cut of the sheets.

Further, the above mentioned conventional cutting machines while being able to cut continuously to a set size flat sheets of paper or cardboard or any such material which is rigid, will not cut evenly with that same precision single or double corrugated paper which has not incorporated therein a flat sheet to act as an anchoring means for the corrugations.

The machine which is the object of this invention is fitted with new and improved means for guiding the paper up to and beyond the point where circular cutters cut the paper parallel to its corrugations, a matter which is indispensable in the preparation of rectangles of single or double corrugated paper which are manufactured into tubes by gumming their edges and combining them by a butt joint on an automatic edge joining machine covered by the above mentioned patent application. It is obvious that if the edges which are to be gummed or solutioned are not perfectly parallel to the pitch of the corrugations and thus cut the corrugations obliquely, the junction of the edges will be difficult if not possible and will give rise to waste.

Therefore, according to the invention claimed the automatic cutting machine comprises a moving roll carriage rigidly mounted on a plate for continually feeding the material to the cutters; a set of pusher heads acting on the paper; an adjustment bar; a set of paper guides for exact lining up of the paper cutting; an upper and lower set of circular cutter knives, a pedal control for the feed plate with an automatic engagement and dis-engagement coupling device; and an off-loading conveyor for a tidy collection of the cut rectangles.

It is therefore one object of this invention to provide a new and improved cutting machine for pliable material.

Another object of this invention is to provide a new and improved cutting machine in which the roll of pliable material follows the feed across the work table and adjacent the cutting blades and then returns with the roll of material to its original position.

A further object of this invention is to provide a cutting machine for pliable material in which a new and improved guiding means is provided for guiding the feed and roll carriage across a fixed work table.

A still further object of this invention is to provide new and improved runnerlike blades placed adjacent the cutter blades for penetrating the corrugations to guide the paper to the cutter knives to cut the paper parallel to the corrugations.

Other objects and advantages of this invention will become apparent from the following description when read in connection with the accompanying drawings in which:

Fig. 7 is a partially sectioned view, in perspective, of the cutter knife shaft supports;

Fig. 8 is a partially sectioned perspective view of a paper guide; and

Fig. 9 is a schematic view of the transmission mechanism to the various parts in motion of the machine.

The particular machine described is designed to operate within the following dimensional limits:

| | Cm. |
|---|---|
| Maximum height of paper rolls (width) which can be fed onto the machine | 50 |
| Minimum height of paper rolls which can be fed onto the machine | 7 |
| Maximum width of cut (use full width of machine) | 110 |
| Minimum width of cut (between one cut and the next) | 7 |

It is obvious that one can vary, within reasonable limits, the above dimensions without altering the principles on which the machine is based.

In the description which follows reference will be made to single or double corrugated paper because the machine described has been specially designed to work with this type of paper. This however does not limit in any way the generality of the application of the machine according to the invention.

Figure 1:
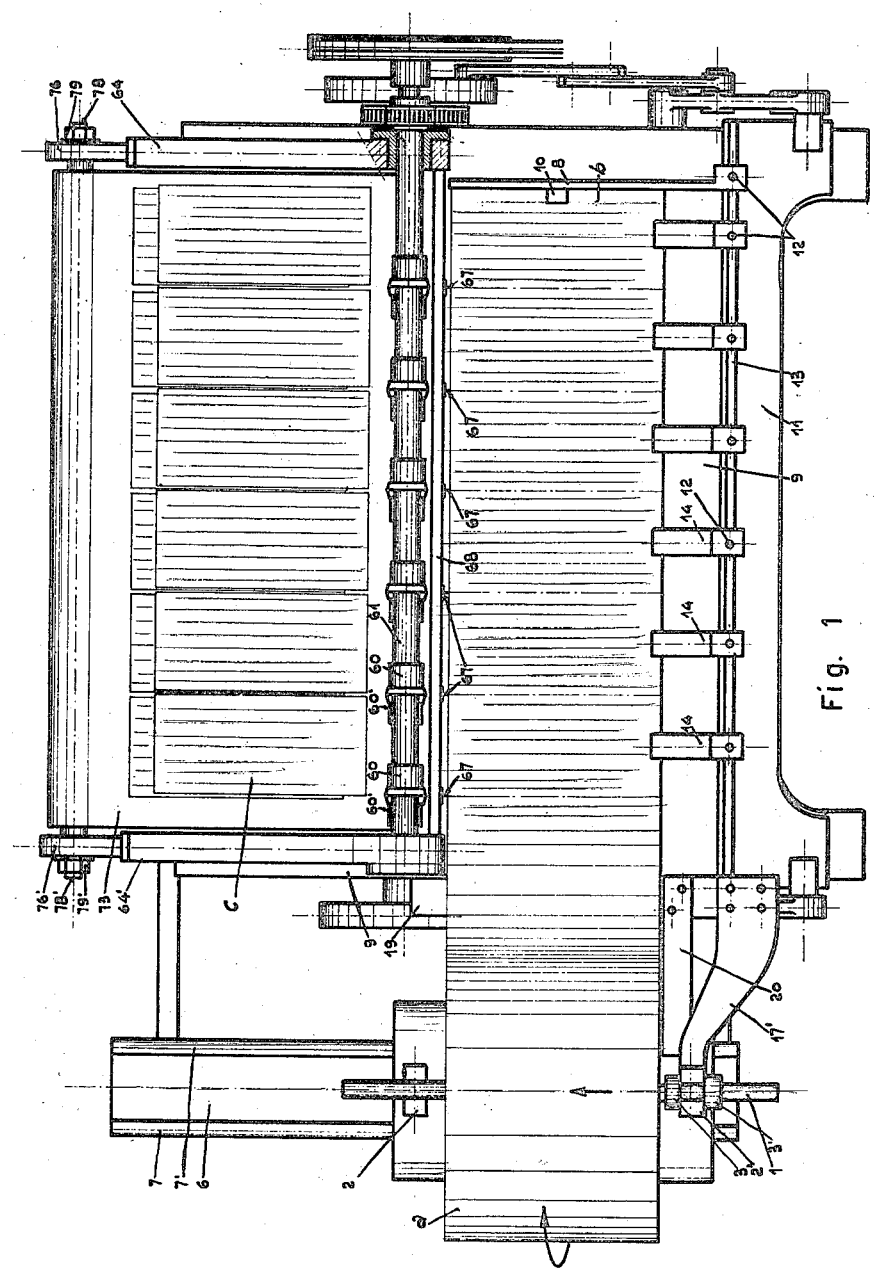
Fig. 1 shows a general plan view of the machine.

A roll of single or double corrugated paper $a$, specially cut longways to the width (in the direction of the corrugations) of the rectangles which have to be produced, is hand loaded onto a spool or roll shaft 1 (Fig. 1) which, as it simply rests on two support bearings 2 and 2', is free to turn. So as to avoid possible side movement of the spool shaft, two rings 3 and 3' have been keyed onto the shaft 1 on each side of the support 2'.

Figure 2:
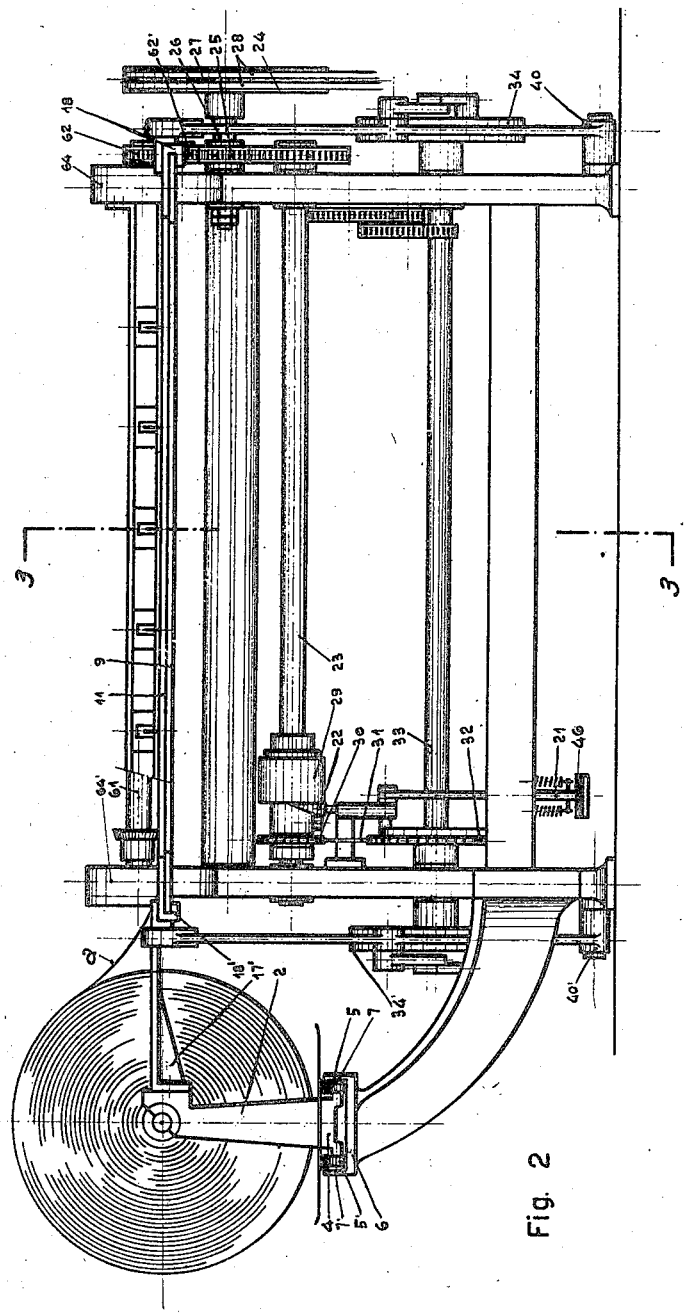
Fig. 2 shows a side view of the machine, as seen from the loading side.

The supports 2 and 2' are fixed to a carriage 4 (Fig. 2) which, being mounted on ball bearings 5 and 5', can run along a track 6 which is defined by side guides 7 and 7'.

The extremity $b$ of the continuous roll of single or double corrugated paper $a$ (Fig. 1) is brought by hand up to a setting up bar 8, by sliding the paper over a work table 9. The setting up bar 8, on which is fixed a spring 10 acting as a stop for the end $b$, is fitted square but in such a manner as to be adjustable, on a feed plate 11 by means of a screw 12 sunk into a hollow 13. Usually the position of the setting up bar 8 is adjusted so that its distance from the nearest pair of cutter knives is equal to the width of the desired rectangle, in order to avoid waste trimmings.

Figure 4:
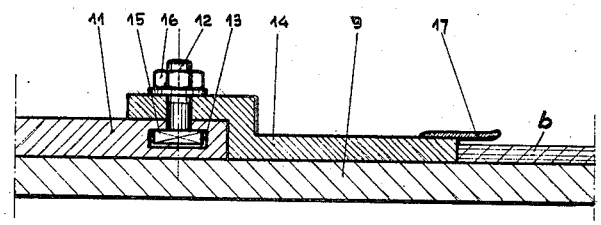
Fig. 4 is a detail view in section of the paper pusher head.

In the same way, to the feed plate 11 are fitted a plurality of paper pusher heads 14. As illustrated (Fig. 4) a fixing bolt 12 has its head sliding inside a slot 13, while a nut 16 serves to hold it in position. At the other end of the pusher head 14 is superimposed a small formed plate 17 which serves to assure the grip on the single or double corrugated paper *b* which is pressed onto the working surface 9.

The feed plate 11 is fixed solid to the carriage 4 carrying the roll of corrugated paper (Fig. 2) by means of a bracket 17' and is guided in its back and forwards movement by lateral slides 18 and 18' which slide on the edges of the work table 9. So as to assure a better precision in the movement of the feed plate 11 (Fig. 1) there is fitted a guide 19 which, being squarely fitted to the feed plate 11 and anchored to the support 2' on the spool or roll carriage 4 by a crosspiece 20, runs just at the edge of the left hand side of the table 9 keeping perfectly square the feed plate.

The movement of the feed plate 11 and consequently the spool carriage 4 is controlled by a lever 21 (Figs. 2 and 3) through an automatic engagement and disengagement mechanism generally illustrated by a stop device 22.

Shaft 23 (Figs. 2 and 9) is constantly connected to the motor unit through a cylindrical gear couple 24 and 25, a shaft 26, a pulley 27 and a V belt 28. On the shaft 23 (Fig. 2) a sleeve 29 is slidably keyed. Through the stop device 22, which is controlled by the pedal lever 21, the rotational motion of the shaft 23 is transmitted to the sleeve 29. Pedal lever 21 when in the lowered position allows automatic engagement of the sleeve 29 with the shaft 23. A sprocket wheel 30 is keyed to sleeve 29 and by means of a chain 31, transmits, in turn, its motion to a sprocket wheel 32 which is keyed to the shaft 33.

Figure 5:
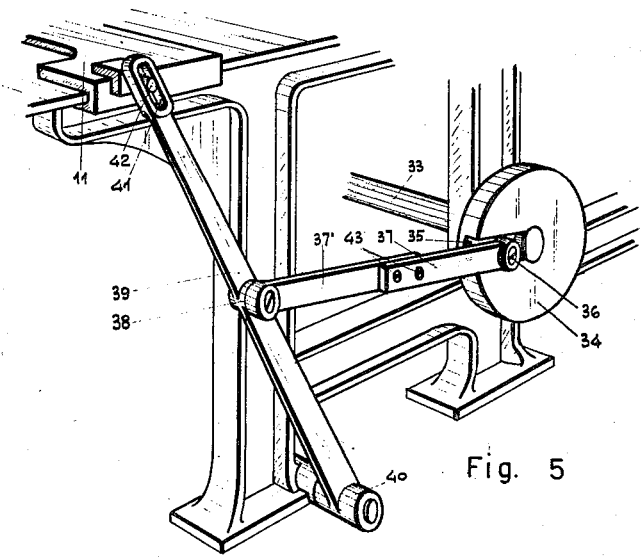
Fig. 5 is a schematic view, in perspective, of the transmission for the feed plate movement.

At both ends of the shaft 33 (Fig. 2) are fixed the wheels 34 and 34', whose rotational movement is converted into alternating motion by the feed plate 11 drive. As noted in Fig. 5 wheel 34 is provided with an eccentrically arranged slot 35 into which is fitted by means of a screwed pin 36, one end of a lever. This lever comprising two parts 37—37' is pinned at the other end at 38 to a second lever 39. Lever 39 is fulcrumed at one end at 40 and provided at its other end with a slot 41 inside of which a roller 42 is fixed to the feed plate 11. It is apparent that the two levers 37—37' and 39 form a jointed system which, exploiting the eccentricity of the fixed point of the lever 37 on the wheel 34, converts the rotation of the shaft 33 into an alternative motion of the feed plate 11.

The travel of the feed plate 11 can be suitably adjusted to the width of the roll of single or double corrugated paper *a* by shifting the fixing screws 36 (Fig. 5) within the slot 35 on the wheel 34, and by the screws 43 which allow the lengthening or shortening of the lever 37—37'. An identical jointed system is applied at the other side of the machine between the feed plate 11 and the eccentric wheel 34'.

Since from a practical point of view, it is desirable that the feed plate 11 should stop at a definite starting point after each alternating motion so as to allow the hand feed of the single or double corrugated paper *b* from the roll *a*. At every complete turn of the wheels 34 and 34' (Fig. 2) the stop device 22, returning to its original position, automatically releases the sleeve 29 from the shaft 23 and thus stops the movement of the feed plate 11 in the desired position.

Figure 6:
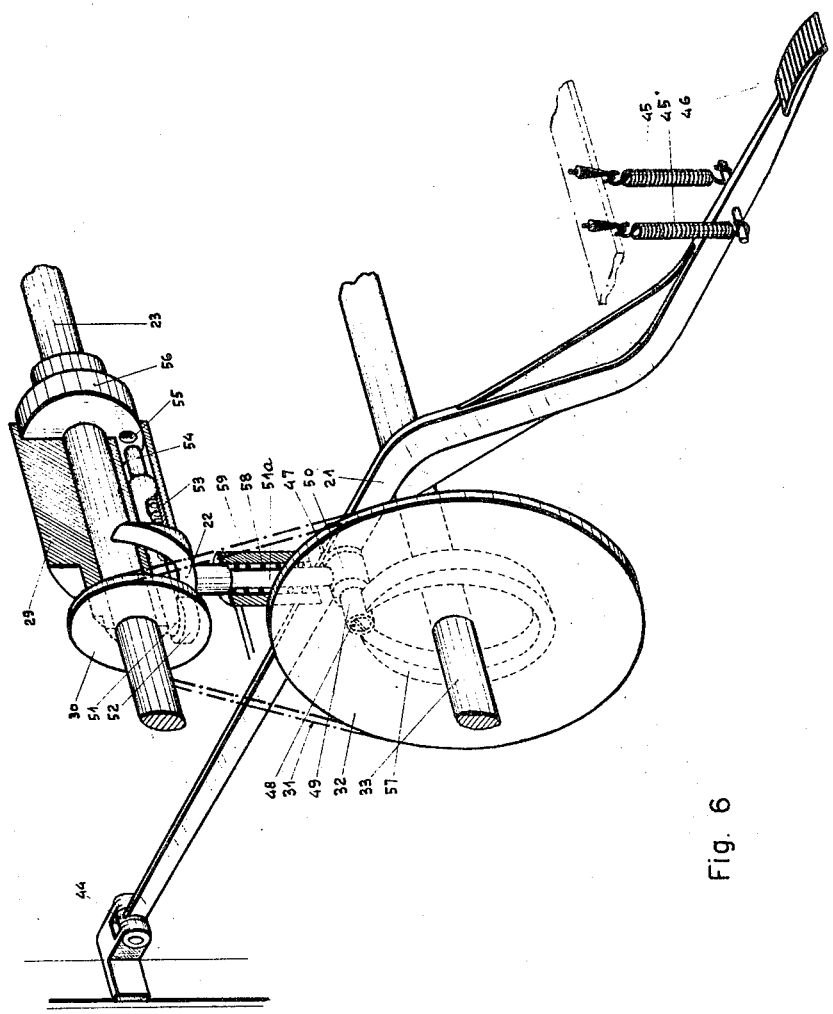
Fig. 6 is a schematic view, in perspective, of the pedal control with the automatic engagement and disengagement, mechanism.

The automatic engagement and disengagement of the sleeve 29 with respect to the continual rotation of the shaft 23 is effected in the following way:

The pedal lever 21 (Fig. 6) is hinged to a frame structure at a point 44 at one end thereof and is supported at the other end by two return springs 45 and 45'. The end supporting springs 45, 45' is provided with a pedal 46. On the wrist pin seat or hub 47 situated in the central portion of the pedal lever 21 is fixed a wrist pin 48 on which is mounted a roller 49 and a collar 50. Collar 50 is solidly fitted to a connector 51a which carries the stop device 22 for the automatic engagement and disengagement action of sleeve 29. By pressing on the pedal 46, the lever 21 is lowered and pulls downward the stop device 22. At this point in the operation of the cutting device the spring loaded connector 51, on whose head roller 52 rests strikes against the stop device 22 and trips forwards due to the effect of the spring 53. Pin or dowel 54 then enters housing 55 in disc 56 when shaft 23, with which disc 56 is fixedly attached rotates itself and the pin hole 55 in line with the pin 54. In this way the sleeve 29 becomes locked solid with the continuously rotating shaft 23 and by means of the sprocket wheel 30, the chain 31, the sprocket wheel 32 and other mechanism already illustrated (Fig. 5), transmits the alternating motion to the feed bar 11. The inner face of sprocket 32 is provided with a specially profiled cam 57. Cam 57 traps the roller 49 mounted on the pin 48 at the moment pedal lever 21 moved by pressure on the end 46, is lowered.

Figure 3:
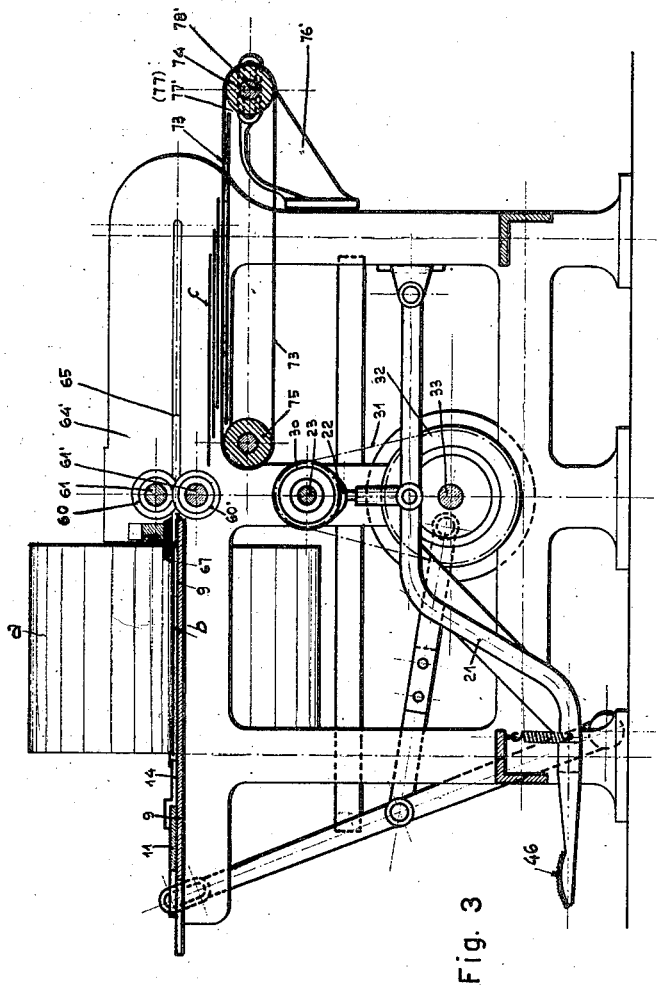
Fig. 3 is a vertical section of the machine, through the line 3—3 in Fig. 2.

The roller 49, which is forced to run on the internal surface of the cam, keeps the pedal lever 21 lowered until, at the end of a turn of the sprocket wheel 32, the roller 49 finds its way out of the cam 57. The pedal lever 21, due to the action of the springs 45 and 45' and of the spring 58 housed in the support 59 of the connector 51a, lifts itself, returning to the original position. With the pedal lever 21, the stop device 22 rises and returns to its original position, so that the roller 52 running on the inclined plane offered by the stop device is forced to recede, dragging with it the spring loaded pin 51. This action causes the exit of the pin or dowel from its housing 55 in the plate 56 and consequently the freeing of the sleeve 29 from the continuously rotating shaft 23. Naturally the various parts making up the complete mechanism have to be timed so that the disengagement of the sleeve 29 from the shaft 23 comes at the end of the return stroke of the feed plate 11 (Fig. 3). To obtain further back and forwards motion of the feed plate 11 it is necessary, each time, to move the control lever 21 by pressure on the pedal 46.

The circular knife cutters 60 and 60' (Fig. 1) are the normal dished type and are mounted in pairs with the usual means for locking them in position on the upper shaft 61 and on the lower shaft 61'. As noted in Fig. 3 the shafts 61 and 61' are placed on the output side of the work table 9 in such a position as to be able to place the cutters 60 and 60' at a suitable height to take a sheet of single or double corrugated paper *b*.

The shafts 61 and 61' are carried, at the driven end, by a shoulder 64 (Fig. 2) of the machine. The shaft 61' (Fig. 9) is driven by the gear 25 already mentioned, meshing with a gear 62' which in its turn meshes with a gear 62. Gear 62 is keyed to the shaft 61. Shafts 61 and 61' in this arrangement have differing senses of rotation.

On the opposite end (Fig. 7), the shafts 61 and 61' are mounted in special flanged bushings 63 and 63' which are fitted in the left shoulder of the machine (Fig. 3) respectively above and below the longitudinal opening 65. The corrugated sheet *b* passes through opening 65 during the back and forwards motion of the feed plate 11 and the spool or roll carriage 4. The bushings 63 and 63' (Fig. 7), which are of a larger size than the circular cutter knives 60 and 60', can be easily removed from the shoulder 64' by slacking off the lock screws 66 and 66'; thus through the space left in the shoulder 64 one can withdraw the circular cutters 60 and 60' when necessary for maintenance.

The travel of the feed plate 11 (Figs. 1 and 3) is such as to make the paper push heads 14, push the sheet of single or double corrugated paper $b$ towards the circular cutters 60 and 60' up to the end of the cut. These pusher heads pass between each pair of cutters formed by 60 and 60' and advance past the actual cutting point.

However, in order to assure the parallelism between the cut and the corrugations, a paper guide 67 (Fig. 3) is fitted at each pair of circular cutters 60 and 60'. These guides enter the corrugations of the material to be cut to avoid any lateral shift of the paper and oblige the cutters to cut parallel to the corrugations. These paper guides 67 (Fig. 1) are mounted on a guide bar, which mounting allows them to be adjustable on the guide bar 68 which is fitted to the ends of the shoulders 64 and 64' of the machine.

The paper guides 67 (Fig. 8) are arranged and designed so as to be able to accompany the sheet of single or double corrugated paper $b$ right up to the point where the cutters 60 and 60' meet in the actual cut. Further the paper guides are sufficiently long to ensure a perfect guiding action within the corrugations in which they work. The paper guides 67 are fixed to a suitable shaped block 70 by means of a small plate 69 so as to be able to slide inside a rectangular guide 71. Guide 71 runs the whole length of the guide carrier bar 68. The locking screws 72 pass through the block 70 and press against the bottom of the rectangular guide 71 to lock the block 70 in the desired position.

After each cut, the rectangles of single or double corrugated paper $c$ fall into a conveyor 73 for the off loading (Figs. 1 and 3) partially piling up on the earlier cut rectangles. The neat and tidy arrangement of each set of cut rectangles, which is useful for the next step of feeding the tube making and jointing machine, is made possible because the movement forwards of the conveyor 73, which moves very slowly, happens only during the actual cutting action.

The conveyor 73 (Fig. 3) is carried by an idle roller 74 and a controlled roller 75. The idle roller 74 is carried (Figs. 1 and 3) by brackets 76 and 76' which, being provided with slots 77 and 77' in which pins 78 and 78' are received, allow adjustment of the position of the roller 74 to obtain a right tension for the conveyor. The fixing in position of the pins 78 and 78' is made by means of nuts 79 and 79'.

The conveyor 73 (Fig. 9) takes its motion from the shaft 33 (which, as already illustrated, is that which gives the alternating motion to the feed plate 11), through gear 80 keyed to the shaft 33, gear 81 which is solid with gear 82, gear 83 which is solid with sprocket wheel 84, chain 85 and sprocket wheel 86 keyed to shaft 87 of the roller 75. Since the shaft 33, due to the automatic engagement and disengagement action already described, turns only for every feed for the cut of the single or double corrugated paper $b$, thus the conveyor 73 obtains a slight forwards motion at each cut and as a result the single or double corrugated paper rectangles $c$ are piled on it in neat heaps ready to be collected.

Although but one embodiment of the present invention has been described, it will be apparent to those skilled in the art that various changes and modifications may be made therein without departing from the spirit of the invention or from the scope of the appended claims.

I claim:

1. A machine for feeding and cutting pliable material comprising a work table, a feeder plate movably mounted on said table for lateral movement of said table, carriage means mounted on said table and attached to said plate for movement with said plate, means for supporting a roll of the material on said carriage means so that the material may be drawn from said roll across said plate transversely to the direction of movement of said plate, cutting means mounted adjacent said plate for cutting the material upon lateral movement of said plate, means for engaging the material upon lateral movement of said plate for retaining the material substantially stationary on said plate during movement of said material into said cutting means, and means for simultaneously actuating said plate and said carriage means laterally across said table to push the material on said plate into said cutting means.

2. A machine for feeding and cutting pliable material comprising a work table having a longitudinal axis, a feeder plate movably mounted on said table for movement laterally of said axis of said table, carriage means mounted on said table and attached to said plate for movement with said plate, means for supporting a roll of the material on said carriage means so that the material may be drawn from said roll across said plate in the direction of said axis of said table, cutting means mounted adjacent said plate for cutting the material upon lateral movement of said plate, means for engaging the material upon lateral movement of said plate for retaining the material substantially stationary on said plate upon movement of said material into said cutting means, and means for actuating said plate and said carriage means laterally across said table to push the material on said plate into said cutting means.

3. A machine for feeding and cutting pliable material comprising a work table having a longitudinal axis, a feeder plate movably mounted on said table for movement laterally of said axis of said table, carriage means mounted on said table and attached to said plate for movement with said plate, means for supporting a roll of the material on said carriage means so that the material may be drawn from said roll across said plate in the direction of said axis of said table, cutting means mounted adjacent said plate for cutting the material upon lateral movement of said plate, means mounted on said plate for pushing the material into said cutting means upon lateral movement of said plate, means for engaging the material upon lateral movement of said plate for retaining the material substantially stationary on said plate upon movement of said material into said cutting means, and means for actuating said plate, said carriage means and said pushing means laterally across said table to push the material on said plate into said cutting means.

4. A machine for feeding and cutting pliable material comprising a work table having a longitudinal axis, a feeder plate movably mounted on said table for movement laterally of said axis of said table, carriage means mounted on one end of said table and attached to said plate for movement with said plate, means for supporting a roll of the material on said carriage means so that the material may be drawn from said roll across said plate in the direction of said axis of said table, cutting means comprising a pair of cooperating circular knife cutters mounted adjacent said plate for cutting the material upon lateral movement of said plate, means mounted on said plate for pushing the material laterally into said cutting means upon movement of said plate, means for engaging the material upon lateral movement of said plate for retaining the material substantially stationary on said plate upon movement of said material into said cutting means, means for actuating said plate, said carriage means and said pushing means laterally across said table to push the material on said plate into said cutting means, and pedal means for manually controlling the actuation of said plate and carriage means.

5. A machine for feeding and cutting pliable corrugated material having a plurality of ridges and grooves comprising a work table having a longitudinal axis, a feeder plate movably mounted on said table for lateral movement of said axis of said table, carriage means mounted on said table and attached to said plate for movement with said plate, means for supporting a roll of the material on said carriage means so that the material may be drawn from said roll across said plate in the direction of said axis of said table, cutting means mounted adjacent said plate for cutting the material upon lateral movement of said plate, guiding means for insertion into the grooves of the material for retaining the material substantially stationary on said plate upon movement of the material into said cutting means, and means for actuating said plate and said carriage means laterally across said table to push the material on said plate into said cutting means.

6. A machine for feeding and cutting pliable corrugated material having a plurality of ridges and grooves comprising a work table having a longitudinal axis, a feeder plate movably mounted on said table for lateral movement of said axis of said table, carriage means mounted on one end of said table and attached to said plate for movement with said plate, means for supporting a roll of the material having ridges and grooves extending substantially parallel to the longitudinal axis of said roll on said carriage means so that the material may be drawn from said roll across said plate in the direction of said axis of said table, cutting means comprising a pair of cooperating circular knife blades mounted adjacent said plate for cutting the material upon lateral movement of said plate, means mounted on said plate for pushing the material into said cutting means upon lateral movement of said plate, guiding means arranged on said table for insertion into the grooves of the material for retaining the material substantially stationary on said plate upon movement of the material into said cutting means, and means for simultaneously actuating said plate and said carriage means laterally across said table to push the material on said plate into said cutting means.

7. A machine for feeding and cutting pliable corrugated material having a plurality of ridges and grooves comprising a work table having a longitudinal axis, a feeder plate movably mounted on said table for reciprocating movement laterally of said axis of said table, carriage means mounted on one end of said table and attached to said plate for reciprocating movement with said plate, means for supporting a roll of the material having ridges and grooves extending substantially parallel to the longitudinal axis of said roll on said carriage means so that the material may be drawn from said roll across said plate in the direction of said axis of said table, cutting means comprising a pair of cooperating circular knife blades mounted adjacent said plate for cutting the material upon lateral movement of said plate, means mounted on said plate for pushing the material into said cutting means upon lateral movement of said plate, guiding means comprising a plurality of knife-like runners mounted on said table for insertion longitudinally into the grooves of the material for retaining the material substantially stationary on said plate upon movement of the material into said cutting means, and means for actuating said plate and said carriage means laterally across said table to push the material on said plate into said cutting means.

8. A machine for feeding and cutting pliable corrugated material having a plurality of ridges and grooves comprising a work table having a longitudinal axis, a feeder plate movably mounted on said table for reciprocating movement laterally of said axis of said table, carriage means mounted on one end of said table and attached to said plate for reciprocating movement with said plate, means for supporting a roll of the material having ridges and grooves extending substantially parallel to the longitudinal axis of said roll on said carriage means so that the material may be drawn from said roll across said plate in the direction of said axis of said table, cutting means comprising a pair of cooperating circular knife blades mounted adjacent said plate for cutting the material upon lateral movement of said plate, means mounted on said plate for pushing the material into said cutting means upon lateral movement of said plate, guiding means comprising a plurality of runnerlike blades adjustably mounted on said table adjacent said circular knife blades for penetrating longitudinally into the grooves of the material for retaining the material in a given position on said plate upon movement of the material into said cutting means, and means for actuating said plate and said carriage means laterally across said table to push the material on said plate into said cutting means.

9. A machine for feeding and cutting pliable corrugated material having a plurality of ridges and grooves comprising a work table having a longitudinal axis, a feeder plate movably mounted on said table for reciprocating movement laterally of said axis of said table, carriage means mounted on one end of said table and attached to said plate for reciprocating movement with said plate, means for supporting a roll of the material having ridges and grooves extending substantially parallel to the longitudinal axis of said roll on said carriage means to that the material may be drawn from said roll across said plate in the direction of said axis of said table, cutting means comprising a pair of cooperating circular knife blades mounted adjacent said plate for cutting the material upon lateral movement of said plate, means mounted on said plate for pushing the material into said cutting means upon lateral movement of said plate, guiding means comprising a plurality of runnerlike blades adjustably mounted on said table adjacent to and in front of the cutting edge of said circular knife blades for penetrating longitudinally into the grooves of the material and sliding in the grooves of the material upon movement of the material into said cutting means, said guiding means impeding any side shift of the material, and means for actuating said plate and said carriage means laterally across said table to push the material on said plate into said cutting means.

10. A machine for feeding and cutting pliable corrugated material having a plurality of ridges and grooves comprising a work table having a longitudinal axis, a feeder plate movably mounted on said table for reciprocating movement laterally of said axis of said table, carriage means mounted on one end of said table and attached to said plate for reciprocating movement with said plate, means for supporting a roll of the material having ridges and grooves extending substantially parallel to the longitudinal axis of said roll on said carriage means so that the material may be drawn from said roll across said plate in the direction of said axis of said table, cutting means comprising a pair of cooperating circular knife blades mounted adjacent said plate for cutting the material upon lateral movement of said plate, means mounted on said plate for pushing the material into said cutting means upon lateral movement of said plate, guiding means comprising a guide bar, means for mounting said guide bar on said table, a plurality of runnerlike blades adjustably mounted on said guide bar with at least one runnerlike blade mounted adjacent to and in front of the cutting edge of each pair of cooperating circular knife blades, said runnerlike blades penetrating longitudinally into the grooves of the material and sliding in the grooves of the material upon movement of the material into said cutting means, said guiding means impeding any side shift of the material, and means for actuating said plate and said carriage means laterally across said table to push the material on said plate into said cutting means.

11. A machine for feeding and cutting pliable corrugated material having a plurality of ridges and grooves comprising a work table having a longitudinal axis, a feeder plate movably mounted on said table for reciprocating movement laterally of said axis of said table, carriage means mounted on one end of said table and attached to said plate for reciprocating movement with said plate, means for supporting a roll of the material having ridges and grooves extending substantially parallel to the longitudinal axis of said roll on said carriage means so that the material may be drawn from said roll across said plate in the direction of said axis of said table, cutting means comprising a pair of cooperating circular knife blades mounted adjacent said plate for cutting the material upon lateral movement of said plate, means mounted on said plate for pushing the material into said cutting means upon lateral movement of said plate, guiding means comprising a plurality of runnerlike blades adjustably mounted on said table adjacent to and in front of the cutting edges of said circular knife blades for penetrating longitudinally into the grooves of the material upon movement of the material into said cutting means, said guiding means impeding any side shift of the material, and means for actuating said plate and said carriage means laterally across said table to push the material on said plate into said cutting means, said means comprising a drive shaft, a wheel mounted on said drive shaft and provided with an eccentrically arranged slot, a first lever adjustably connected at one end thereof in said slot, a second lever pivotally mounted at one end on said table and at the other end provided with a lost motion connection, a roller attached to said plate and arranged in said lost motion connection of said second lever, and means for connecting the other end of said first lever to said second lever at a point between the ends thereof, said levers exploiting the eccentricity of the attachment of said first lever in said slot of said wheel to convert rotary motion of said shaft into reciprocating motion of said plate.

12. A machine for feeding and cutting pliable corrugated material having a plurality of ridges and grooves comprising a work table having a longitudinal axis, a feeder plate movably mounted on said table for reciprocating movement laterally of said axis of said table, carriage means mounted on one end of said table and attached to said plate for reciprocating movement with said plate, means for supporting a roll of the material having ridges and grooves extending substantially parallel to the longitudinal axis of said roll on said carriage means so that the material may be drawn from said roll across said plate in the direction of said axis of said table, means arranged adjacent the roll of the material for holding the material flat on said plate during movement of the material with said plate, cutting means comprising a pair of cooperating circular knife blades mounted adjacent said plate for cutting the material upon lateral movement of said plate, means mounted on said plate for pushing the material into said cutting means upon lateral movement of said plate, guiding means comprising a plurality of runnerlike blades adjustably mounted on said table adjacent to and in front of the cutting edges of said circular knife blades for penetrating longitudinally into the grooves of the material upon movement of the material into said cutting means, said guiding means impeding any side shift of the material, and means for actuating said plate and said carriage means laterally across said table to push the material on said plate into said cutting means, said means comprising a drive shaft, a wheel mounted on said drive shaft and provided with an eccentrically arranged slot, a first lever adjustably connected at one end thereof in said slot, a second lever pivotally mounted at one end on said table and at the other end provided with a lost motion connection, a roller attached to said plate and arranged in said lost motion connection of said second lever, and means for connecting the other end of said first lever to said second lever at a point between the ends thereof, said levers exploiting the eccentricity of the attachment of said first lever in said slot of said wheel to convert rotary motion of said shaft into reciprocating motion of said plate.

References Cited in the file of this patent

UNITED STATES PATENTS

| 635,884 | Waltz | Oct. 31, 1899 |
| 861,984 | Hogle et al. | July 30, 1907 |
| 1,208,642 | Pitney | Dec. 12, 1916 |
| 2,143,826 | Davis | Jan. 10, 1939 |
| 2,307,452 | Cohen | Jan. 5, 1943 |
| 2,318,731 | Wood | May 11, 1943 |

FOREIGN PATENTS

| 359,511 | Great Britain | Oct. 16, 1931 |